(12) United States Patent
Peana et al.

(10) Patent No.: US 9,720,158 B2
(45) Date of Patent: Aug. 1, 2017

(54) LIGHT GUIDE FOR DISPLAY LIGHT ENHANCEMENT

(71) Applicant: Dell Products L.P., Round Rock, TX (US)

(72) Inventors: Stefan Peana, Austin, TX (US); Mark Andrew Schwager, Cedar Park, TX (US); Asim M. Siddiqui, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 14/737,329

(22) Filed: Jun. 11, 2015

(65) Prior Publication Data

US 2016/0363707 A1      Dec. 15, 2016

(51) Int. Cl.
*F21V 8/00* (2006.01)

(52) U.S. Cl.
CPC .......... *G02B 6/002* (2013.01); *G02B 6/0025* (2013.01); *G02B 6/0031* (2013.01); *G02B 6/0038* (2013.01); *G02B 6/0058* (2013.01)

(58) Field of Classification Search
CPC .... G02B 6/002; G02B 6/0031; G02B 6/0058; G02B 6/0038; G02B 6/0025
See application file for complete search history.

(56) References Cited

U.S. PATENT DOCUMENTS 4,948,214 A     8/1990 Hamblen

*Primary Examiner* — Joseph L Williams
(74) *Attorney, Agent, or Firm* — Baker Botts L.L.P.

(57) ABSTRACT

A display in a portable information handling system may have a narrow or no border. A light guide for display light enhancement used to illuminate the display may be formed with concave indentations at a first face that receives light from a light source, such as a string of light emitting diodes. The concave indentations may improve the homogeneity of light transmitted by the light guide. The light guide may further have a light diffusive surface treatment at the first face.

18 Claims, 4 Drawing Sheets

LIGHT GUIDE FOR DISPLAY LIGHT ENHANCEMENT

BACKGROUND

Field of the Disclosure

This disclosure relates generally to information handling systems and, more particularly, to a light guide for display light enhancement.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery.

Many information handling systems, including portable devices, are equipped with a display having a string of light emitting diodes (LED) that provide backlight to the display.

SUMMARY

In one aspect, a disclosed light guide is for portable information handling systems. The light guide may include a first face for receiving light from a plurality of light sources. In the light guide, the first face may be formed with at least one concave indentation with respect to the light sources. The light guide may include a second face opposing the first face. In the light guide, the second face may be formed with a concave protrusion with respect to the light sources. In the light guide, the concave protrusion may extend laterally over the second face. The light guide may also include a concave reflector bonded to the concave protrusion to reflect the light back into the light guide, and a third face corresponding to a display surface. In the light guide, the light exits the third face to illuminate the display surface.

In any of the disclosed embodiments, the light guide may include a plurality of concave indentations respectively corresponding in position to at least some of the plurality of light sources. In the light guide, the plurality of concave indentations may reduce a surface area of the third face. In the light guide, at least one of the concave indentations may be parabolic in shape. In the light guide, the concave protrusion may be parabolic in shape.

In any of the disclosed embodiments of the light guide, at least some of the concave indentation may have a different depth from each other. In the light guide, the concave indentations may include first concave indentations having a first depth and second concave indentations having a second depth, where the first depth and the second depth are different. In the light guide, the concave indentations may alternate between the first concave indentation and the second concave indentation.

In any of the disclosed embodiments, the light guide may include an anti-reflective coating covering at least a portion of the first face. In any of the disclosed embodiments, the light guide may include a light diffusive coating covering at least a portion of the first face.

Other disclosed aspects include an information handling system comprising a display including the light guide for display light enhancement.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 4A, and 4B wherein like numbers are used to indicate like and corresponding parts.

Figure 1:
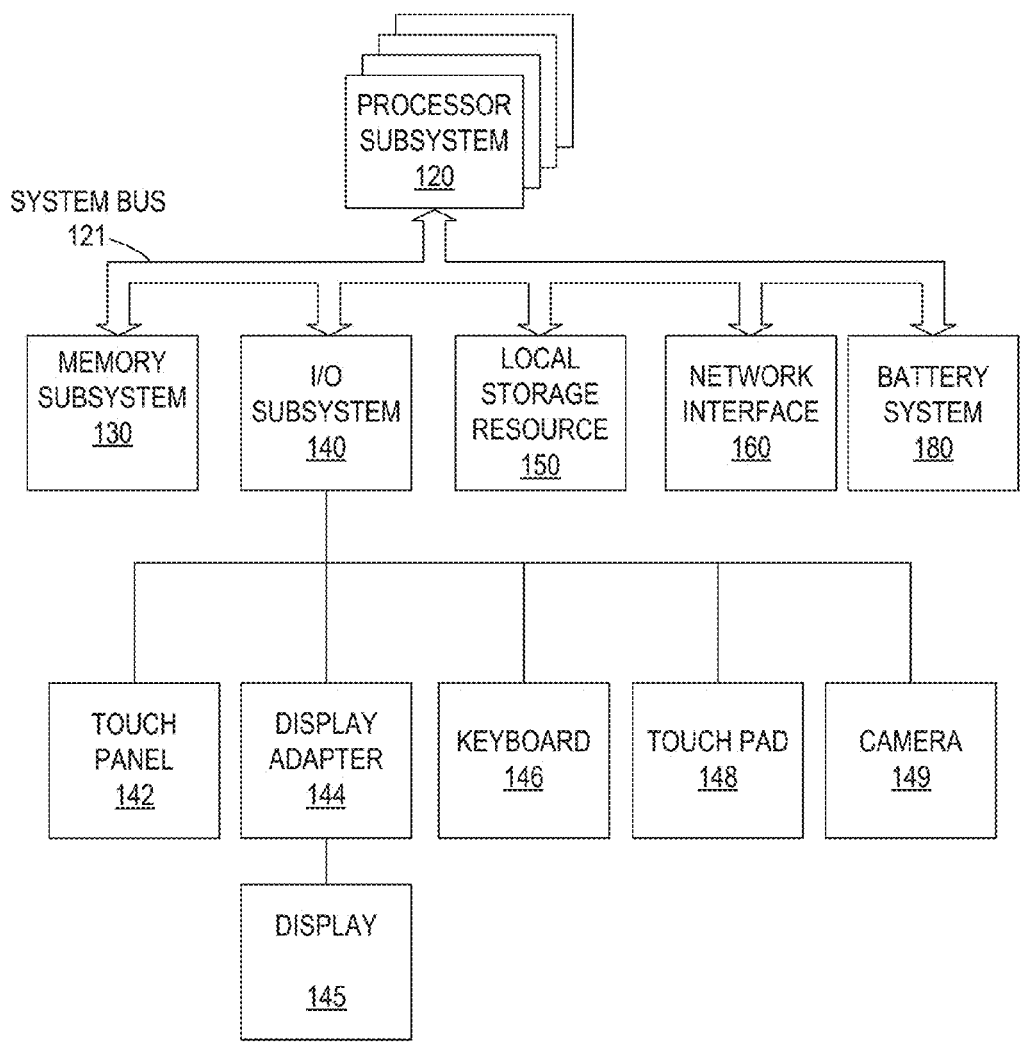
FIG. 1 is a block diagram of selected elements of an embodiment of an information handling system.

Turning now to the drawings, FIG. 1 illustrates a block diagram depicting selected elements of an embodiment of information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or another component of physical hardware 102). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, touch pad 148, and camera 149. Touch panel 142 may include circuitry for enabling touch functionality in conjunction with display 145 that is driven by display adapter 144. Camera 149 may represent any of a variety of imaging devices, such as a video camera, infrared camera, or combinations thereof.

In various embodiments of information handling system 100, such as portable devices or so-called all-in-one devices, display 145 may be mechanically integrated to other components. Furthermore, touch panel 142 may be integrated into display 145 such that a touch user interface is provided to a user. The touch user interface typically coincides with a pixel space of display 145 such that touch inputs correspond to certain display pixels, which may present user interface elements, such as buttons, menus, input fields, etc., to the user.

As display 145 and touch panel 142 become more lightweight and thinner, the display portion may extend nearly to the edge of display 145 and may be implemented with a very small or no border. As a result of having a very thin or no border with display 145, certain issues with the illumination of display 145 may arise. For example, the illumination of display 145 may exhibit certain regions of inhomogeneous light intensity, which is undesirable.

As will be described in further detail herein, display 145 may include a light guide for display light enhancement. The light guide may be equipped with certain features to improve illumination of display 145, particularly to improve the homogeneity of light intensity provided to display 145. Specifically, the light guide may include concave indentations at a first surface of the light guide facing the light source for display 145, which may be a string of LEDs. The concave indentations in the light guide may prevent certain regions of high light intensity from appearing, by improving diffusion of light from the light source within the light guide. Furthermore, a coating may be applied to the first surface, such as an anti-reflective coating or a light diffusive coating. Additionally, at a second surface opposite the first surface, a lateral concave protrusion may be formed in the light guide to improve reflection of light at the second surface, which is a far edge of the light guide. A concave reflector may be bonded to the lateral concave protrusion to prevent undesired loss of light by the light guide.

Figure 2:
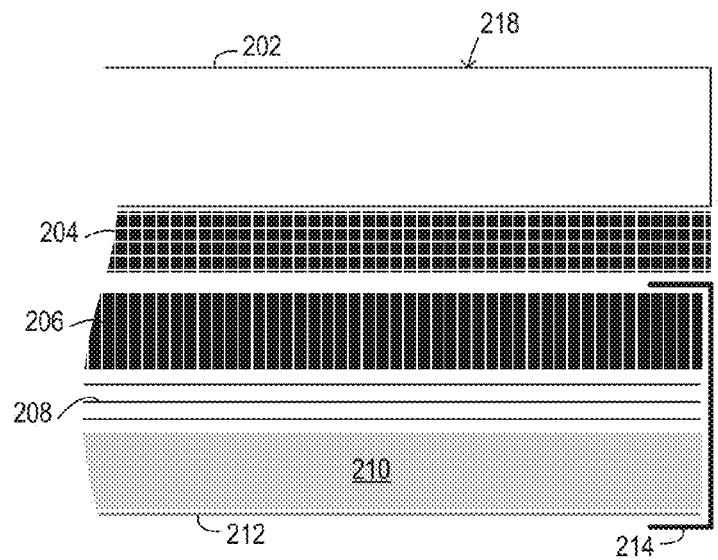
FIG. 2 is a block diagram of selected elements of an embodiments of a display stack with a light guide.

Referring now to FIG. 2, selected elements of an embodiment of a display stack 200 in an information handling system are illustrated. FIG. 2 is a schematic illustration and is not drawn to scale. As shown, display stack 200 illustrates various layered elements included in a thin display device having touch functionality, such as in a portable information handling system. One embodiment of the construction of display stack 200 is shown in a cut-away view at an edge portion in FIG. 2, which enables a display having a very small or no border to be implemented. It is noted that different constructions of display stack 200 may be used with light guide 210 for display light enhancement, as disclosed herein.

In display stack 200, cover glass 202 may be an external cover layer that is optically transparent. Accordingly, display surface 218 is an output display surface of display stack 200 that faces a user. Cover glass 202 may be bonded to, or may be in contact with, touch panel layer 204, which may represent an array of sensors that are sensitive to touch inputs on cover glass 202 received from a user. For example, touch panel layer 204 may be a capacitive touch sensor and may be correspondingly connected to electronics for driving and sensing touch operation, which are not shown in FIG. 2. As shown in FIG. 2, cover glass 202 and touch panel layer 204 may be bonded to frame 214, which may be a mechanical support for display components that frame 214 surrounds. It is noted that in some embodiments, frame 214 may be omitted or may be implemented using different elements.

As shown in FIG. 2, frame 214 surrounds liquid crystal display (LCD) cell 206, films 208, light guide 210, and reflector 212. In various embodiments, display stack 200 may further be enclosed in at least one external plastic housing or cover, which is omitted for descriptive clarity in FIG. 2. LCD cell 206 may be an open cell that allows light to be transmitted from light guide 210 towards cover glass 202 to produce a display image. Films 208 may provide various levels of color and light filtering for a desired display image. Reflector 212 may be reflect backlight towards LCD cell 206 to improve illumination. A light source, such as a string (or an array) of LEDs, may be positioned at the first face of light guide 210, which is obscured in FIG. 2 for descriptive clarity (see FIGS. 3, 4A, 4B). It is noted that, in different embodiments, other surfaces of light guide 210 may be covered with a reflecting element, such as a surface between light guide 210 and frame 214, for example.

As will be described in further detail, light guide 210 may be for display light enhancement and may include features at the first face facing the light source, such as concave indentations and different surface treatments. Light guide 210 may further include a concave protrusion at the second face opposite the first face, as well as a concave reflector bonded to the concave surface. Accordingly, light guide 210 may be formed from a light transmitting material, such as a transparent polymer and may correspond in width and height to a display surface size, and is shown having thickness T.

Figure 3:
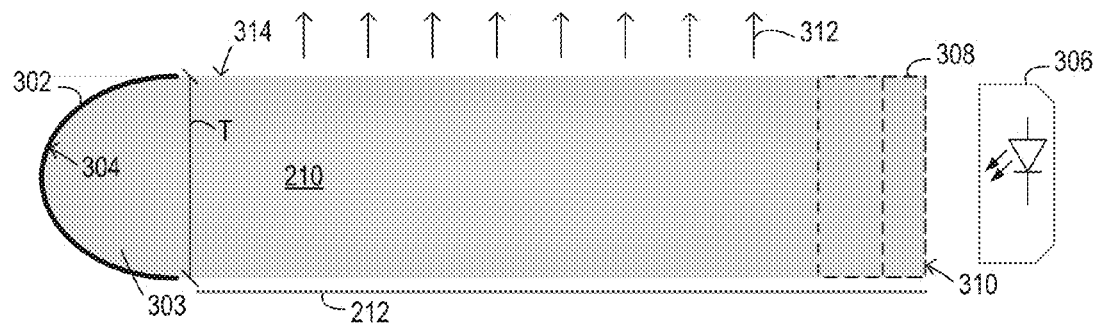
FIG. 3 is a block diagram of selected elements of an embodiment of illumination elements of a display stack including a light guide for display light enhancement.

Referring now to FIG. 3, selected elements of an embodiment of illumination elements 300 in an information handling system are illustrated. FIG. 3 is a schematic illustration and is not drawn to scale. As shown, illumination elements 300 may represent elements for illumination of a display, such as described above with respect to display stack 200 in FIG. 2. Illumination elements 300 are shown from a side view of a display stack in FIG. 3.

As shown, illumination elements 300 comprise LEDs 306, light guide 210, and reflector 212. LEDs 306 may represent a string of LEDs for illuminating the display that stretch along first face 310 of light guide 210 for display light enhancement (see also FIGS. 4A and 4B). In different embodiments, first face 310 may correspond to a top edge or a bottom edge of the display. Reflector 212 is shown at a back face of the display as in FIG. 2. Accordingly, light may be generated at LEDs 306 and enter light guide 210 at first face 310. The light may exit light guide 210 at surface 314 in direction 312 for illuminating the display surface corresponding to surface 314. In order to improve the homogeneity of the light in direction 312, light guide 210 may include concave indentations 308 along first face 310, which are obscured from view in FIG. 3 and are described in further detail with respect to FIGS. 4A and 4B below. Additionally, light guide 210, at second face 304 that is opposite first face 310, may include a concave protrusion 303, as shown in cross section in FIG. 2, that includes concave reflector 302 bonded to concave protrusion 303. Concave reflector 302 may be a reflective element, such as a foil or a metallic strip. In some embodiments, concave reflector 302 is formed using a coating applied to concave protrusion 303. Concave protrusion 303 at second face 304 along with concave reflector 302 may be formed to improve reflection of light back into light guide 210. Without concave protrusion 303 and concave reflector 302, such as a rectangular edge with a reflector, the light reflected at second face 304 may become trapped by internal reflections and may result in an undesirable region of high light intensity, also referred to as a 'hot spot' of optical intensity, along second face 304. Such a hot spot may be particularly problematic with display stack 200 having little or no border region. With concave protrusion 303 and concave reflector 302, the light reflected at second face 304 may exhibit improved diffusion and may provide more uniform illumination without undesirable hot spots along second face 304 and may be more suitable for use in designs with vary narrow or no display border. Additionally, concave protrusion 303 and concave reflector 302 at second face 304 may reduce the loss of light not exiting at surface 314 and so improve overall illumination provided by light guide 210. In given embodiments, the dimensions of concave protrusion 303 may roughly correspond to thickness T of light guide 210. As shown, concave protrusion 303 may be formed laterally in a direction into the page of FIG. 3 along an entire length of second face 304. In some embodiments, concave protrusion 303 and concave reflector 302 may have a parabolic shape in cross section to reflect parallel beams of light back into light guide 210.

Figure 4A:
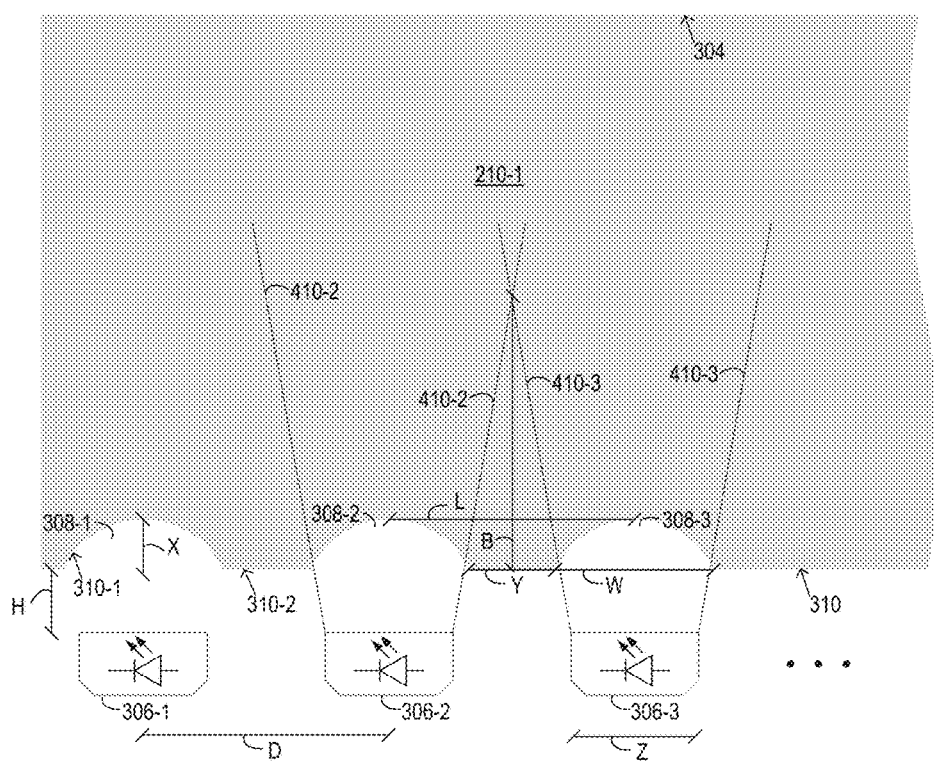
FIG. 4A is a block diagram of selected elements of an embodiment of illumination elements of a display stack including a light guide for display light enhancement.

Referring now to FIG. 4A, selected elements of an embodiment of illumination elements 400 in an information handling system are illustrated. FIG. 4A is a schematic illustration and is not drawn to scale. As shown, illumination elements 400 may represent elements for illumination of a display, such as described above with respect to display stack 200 in FIG. 2. Illumination elements 400 are shown from a top view of a display stack in FIG. 4A and include a corner portion of a display surface that is disproportionately enlarged for descriptive clarity.

As shown in FIG. 4A, illumination elements 400 comprise LEDs 306 and light guide 210-1. LEDs 306 are shown as three instances 306-1, 306-2, 306-3 that represent instances of a string of LEDs for illuminating the display that stretch along first face 310 of light guide 210. The string of LEDs may include up to about 80 LEDs 306 along first face 310. LEDs 306 may be enclosed on three sides with a metal structure (not shown) for mounting, heat dissipation, and reflection of light towards first face 310. Light guide 210-1 is shown with first face 310 and second face 304, as described previously. LEDs 306 are shown having a standoff distance H from first face 310. In different embodiments, first face 310 may correspond to a top edge or a bottom edge of the display. As also shown in FIG. 3, light may be generated at LEDs 306 and enter light guide 210 at first face 310.

An illumination pattern of light generated by LEDs 306 is shown by lines 410 that indicate how the light may diffuse when concave indentations 308 are not present. Thus, lines 410-2 show an illumination pattern for LED 306-2, while lines 410-3 show an illumination pattern for LED 306-3. At a distance B from first face 310 within light guide 210 a hot spot may occur where lines 410-2 and 410-3 cross to create an illumination overlap, which may be undesirable. Thus, concave indentations 308 may improve the diffusion of light from LEDs 306 and may eliminate hot spots, such as at distance B for example.

As shown in FIG. 4A, concave indentations 308-1, 308-2, 308-3 respectively correspond to LEDs 306-1, 306-2, 306-3, which have a width Z and a regular spacing D from each other. Concave indentations 308 are shown as voids in light guide 210-1 having a depth X and width W and a spacing Y. Accordingly, concave indentations 308 may reduce a surface area of light guide 210-1 in a direction normal to the page of FIG. 4A, which corresponds to the display area. However, because of the relatively small dimensions of LEDs 306, the dimensions of concave indentations 308 may be limited to a few millimeters and may be invisible when packaged in the display of a portable information handling system. Thus, in the regularly spaced arrangement in illumination elements 400, where LEDs 306 are aligned with concave indentation 308, which have a common depth X and width W, the distance D equals a distance L between concave indentations 308, where D=L=W+Y. Furthermore, because concave indentations 308, by virtue of shape, improve the diffusion of light entering light guide 210-1, the stand off distance H may be kept relatively small, which may be beneficial for display stack designs having a small or no border.

Additionally, light guide 210-1 may be given any of a variety of surface treatments at first face 310. For example, in some embodiments, an anti-reflective coating may be applied at least one of first face portions 310-1 and 310-2. The anti-reflective coating may reduce light reflected back from LEDs 306 at first face 310. Alternatively or in addition to the anti-reflective coating, a light diffusive coating or surface treatment may be applied to at least one of first face portions 310-1 and 310-2. For example, discrete nanostructures or microstructures, such as a moth eye pattern, may be formed on at least one of first face portions 310-1 and 310-2 to improve the anisotropy of light entering light guide 210-1. In some embodiments, a liquid crystal polymer, such as Lyotropic Liquid Crystal from Light Polymers Technologies, Co., may be applied to at least one of first face portions 310-1 and 310-2 to generate an orderly molecular structure that can diffuse light and improve anisotropy.

Furthermore, a shape of concave indentations 308 may vary in different embodiments. For example, concave indentations 308 may be circular or parabolic in shape. In some embodiments, concave indentations 308 may have an irregular shape. In some embodiments, concave indentations 308 may have a shape that is matched to a spatial or radial intensity profile of light emerging from LED 306.

Figure 4B:
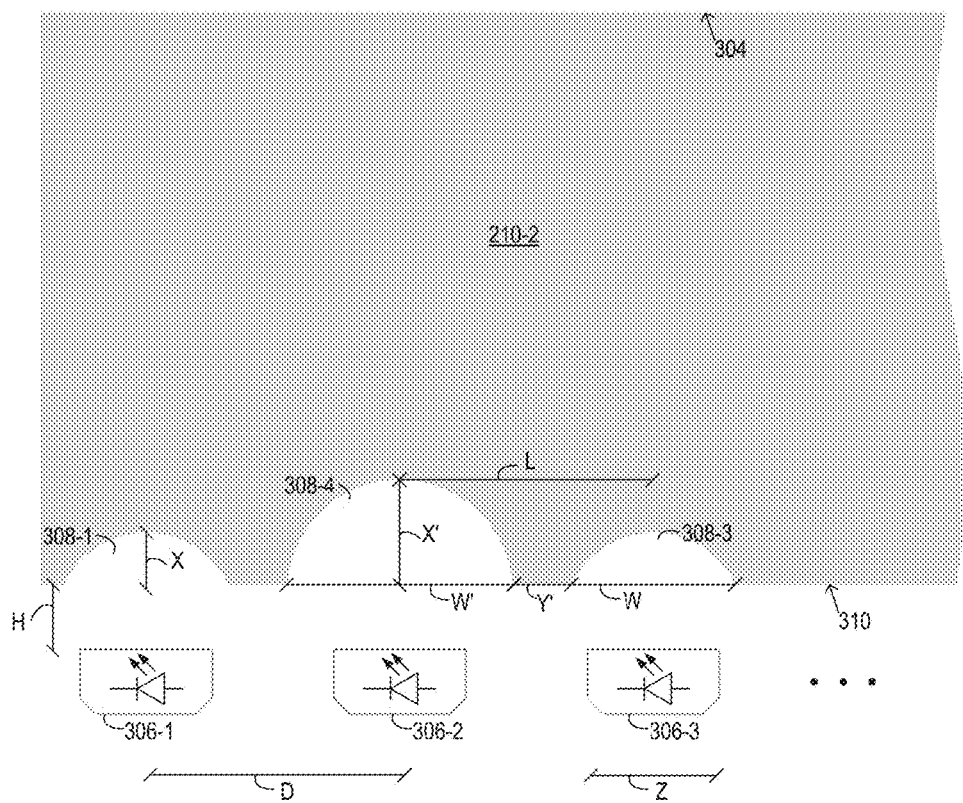
FIG. 4B is a block diagram of selected elements of an embodiment of illumination elements of a display stack including a light guide for display light enhancement.

Referring now to FIG. 4B, selected elements of an embodiment of illumination elements 401 in an information handling system are illustrated. FIG. 4B is a schematic illustration and is not drawn to scale. As shown, illumination elements 401 may represent elements for illumination of a display, such as described above with respect to display stack 400 in FIG. 2. Illumination elements 401 are shown from a top view of a display stack in FIG. 4B and include a corner portion of a display surface that is disproportionately enlarged for descriptive clarity.

As shown in FIG. 4B, illumination elements 401 comprise LEDs 306 and light guide 210-2 and may be substantially similar to illumination elements 400 in FIG. 4A. As shown in FIG. 4B, concave indentations 308-1, 308-4, 308-3 respectively correspond to LEDs 306-1, 306-2, 306-3, which have a width Z and a regular spacing D from each other, with a stand off distance H. LEDs 306 are shown as three instances 306-1, 306-2, 306-3 that represent instances of a string of LEDs for illuminating the display that stretch along first face 310 of light guide 210 for display light enhancement. In contrast to illumination elements 400 in FIG. 4A, concave indentation 308-4 in light guide 210-2 is shown having a larger depth X' and a larger width W' than concave indentations 308-1 and 308-2, as well as a spacing Y'. Thus light guide 210-2 may have alternating depths and widths for successive instances of concave indentations 308, where the distance L between any two instances of concaved indentations 308 is given by L=D=W/2+W'/2+Y'. It is noted that in other embodiments, more than two different depths and widths may be used for concave indentations 308. In some embodiments, an irregular arrangement of concave indentations 308 may be used, with different widths and depths at particular locations. In particular embodiments, different shapes for concave indentations 308 may be used at certain locations, such as for concave indentation 308-1 at a side edge of light guide 210-2.

As disclosed herein, a display in a portable information handling system may have a narrow or no border. A light guide for display light enhancement used to illuminate the display may be formed with concave indentations at a first face that receives light from a light source, such as a string of light emitting diodes. The concave indentations may improve the homogeneity of light transmitted by the light guide. The light guide may further have a light diffusive surface treatment at the first face.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A light guide for portable information handling systems, comprising:
   a first face for receiving light from a plurality of light sources, wherein the first face is formed with at least one concave indentation with respect to the light sources;
   a second face opposing the first face, wherein the second face is formed with a concave protrusion with respect to the light sources, wherein the concave protrusion extends laterally over the second face;
   a concave reflector bonded to the concave protrusion to reflect the light back into the light guide; and
   a third face corresponding to a display surface, wherein the light exits the third face to illuminate the display surface.

2. The light guide of claim 1, further comprising:
   a plurality of concave indentations respectively corresponding in position to at least some of the plurality of light sources, wherein the plurality of concave indentations reduce a surface area of the third face.

3. The light guide of claim 2, wherein at least some of the concave indentation have a different depth from each other.

4. The light guide of claim 3, wherein the concave indentations include first concave indentations having a first depth and second concave indentations having a second depth, wherein the first depth and the second depth are different.

5. The light guide of claim 4, wherein the concave indentations alternate between the first concave indentation and the second concave indentation.

6. The light guide of claim 1, further comprising:
   an anti-reflective coating covering at least a portion of the first face.

7. The light guide of claim 1, further comprising:
   a light diffusive coating covering at least a portion of the first face.

8. The light guide of claim 2, wherein at least one of the concave indentations is parabolic in shape.

9. The light guide of claim 1, wherein the concave protrusion is parabolic in shape.

10. An information handling system comprising:
    a display included in the information handling system; and
    a light guide for illuminating the display, the light guide further comprising:
       a first face for receiving light from a plurality of light sources, wherein the first face is formed with at least one concave indentation with respect to the light sources;
       a second face opposing the first face, wherein the second face is formed with a concave protrusion with respect to the light sources, wherein the concave protrusion extends laterally over the second face;
       a concave reflector bonded to the concave protrusion to reflect the light back into the light guide; and
       a third face corresponding to the display, wherein the light exits the third face to illuminate the display.

11. The information handling system of claim 10, wherein the light guide further comprises:
    a plurality of concave indentations respectively corresponding in position to at least some of the plurality of light sources, wherein the plurality of concave indentations reduce a surface area of the third face.

12. The information handling system of claim 11, wherein at least some of the concave indentation have a different depth from each other.

13. The information handling system of claim 12, wherein the concave indentations include first concave indentations having a first depth and second concave indentations having a second depth, wherein the first depth and the second depth are different.

14. The information handling system of claim 13, wherein the concave indentations alternate between the first concave indentation and the second concave indentation.

15. The information handling system of claim 10, wherein the light guide further comprises:
    an anti-reflective coating covering at least a portion of the first face.

16. The information handling system of claim 10, wherein the light guide further comprises:
    a light diffusive coating covering at least a portion of the first face.

17. The information handling system of claim 11, wherein at least one of the concave indentations is parabolic in shape.

18. The information handling system of claim 10, wherein the concave protrusion is parabolic in shape.

* * * * *